(12) United States Patent
Yokoyama

(10) Patent No.: US 9,541,746 B2
(45) Date of Patent: Jan. 10, 2017

(54) OPTICAL SYSTEM AND IMAGE PICKUP APPARATUS HAVING THE SAME

(71) Applicant: CANON KABUSHIKI KAISHA, Tokyo (JP)

(72) Inventor: Takayoshi Yokoyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/600,812

(22) Filed: Jan. 20, 2015

(65) Prior Publication Data

US 2015/0205080 A1 Jul. 23, 2015

(30) Foreign Application Priority Data

Jan. 22, 2014 (JP) ................. 2014-009268

(51) Int. Cl.
*G02B 15/14* (2006.01)
*G02B 15/15* (2006.01)
*G02B 15/163* (2006.01)

(52) U.S. Cl.
CPC ............ *G02B 15/15* (2013.01); *G02B 15/163* (2013.01)

(58) Field of Classification Search
CPC . H04N 5/23296; G02B 27/0172; G02B 5/005; G02B 27/0025; G02B 3/14; G02B 7/04; G02B 15/177; G02B 15/15; G02B 15/163
USPC .......................................... 359/691, 717, 684
See application file for complete search history.

(56) References Cited

U.S. PATENT DOCUMENTS

| 4,852,984 A | 8/1989 | Takahashi |
| 5,760,967 A * | 6/1998 | Terasawa ............ G02B 15/173 |
| | | 359/684 |

FOREIGN PATENT DOCUMENTS

| JP | 1-185507 A | 7/1989 |
| JP | 2012-168456 A | 9/2012 |

* cited by examiner

*Primary Examiner* — Alicia M Harrington
(74) *Attorney, Agent, or Firm* — Canon USA, Inc. IP Division

(57) ABSTRACT

An optical system includes, a front lens unit having a positive refractive power, an aperture stop, and a rear lens unit having a positive refractive power, wherein the front lens unit includes an FB lens system, and an FA lens system, the FB and FA lens systems being configured to move appropriately, when shifting a focus from an object at a long distance to an object at a short distance. A focal length fFB of the FB lens system and a focal length f of the entire optical system are appropriately set.

10 Claims, 9 Drawing Sheets

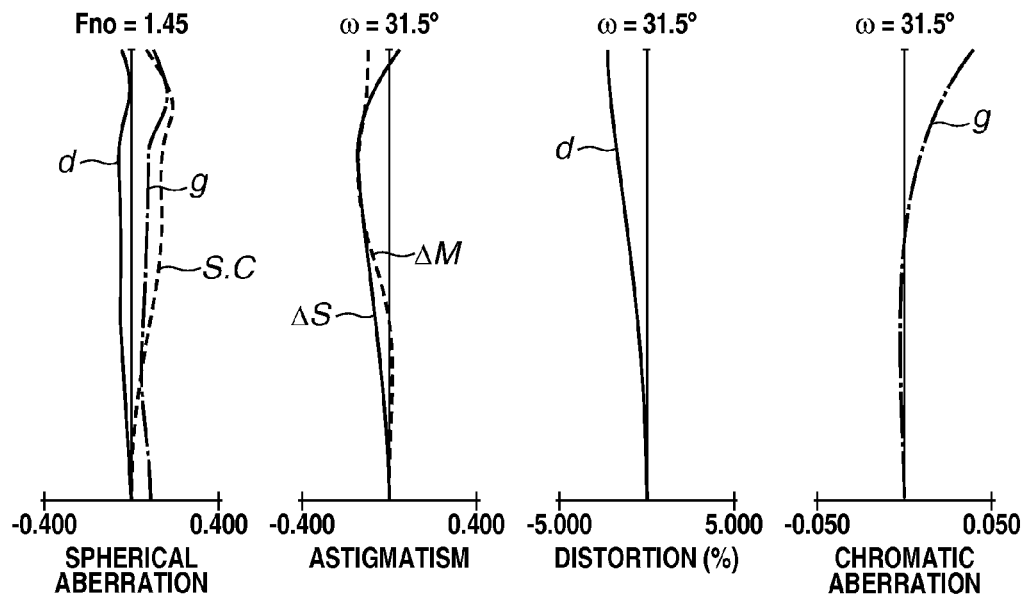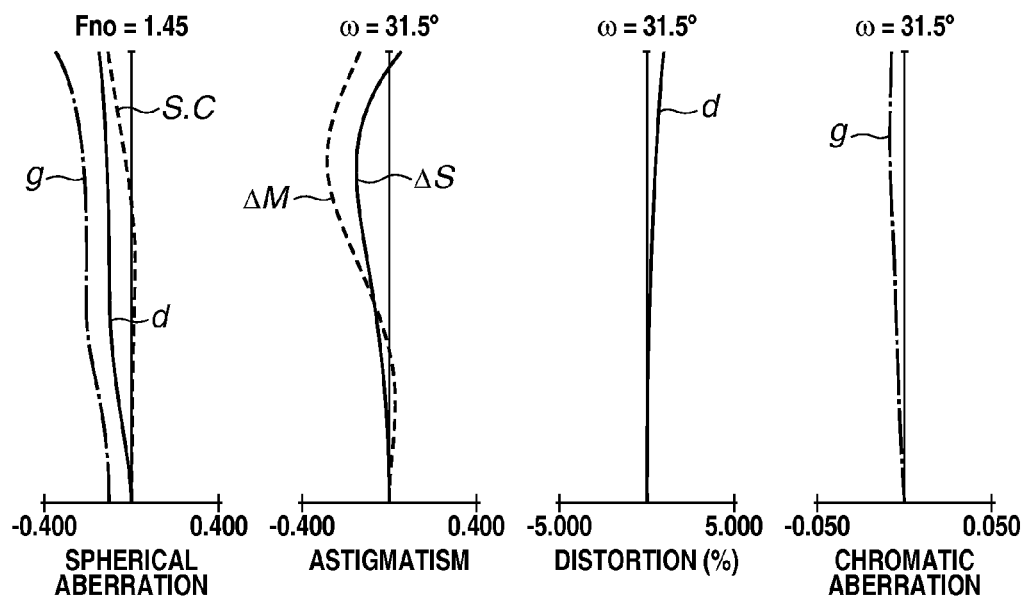

OPTICAL SYSTEM AND IMAGE PICKUP APPARATUS HAVING THE SAME

BACKGROUND

Technical Field

The present disclosure relates to an optical system and an image pickup apparatus including the optical system. The optical system is suitable as an image pickup optical system to be used in an image pickup apparatus such as a digital still camera, a digital video camera, a broadcasting camera, a monitoring camera, and a silver-halide film camera.

Description of the Related Art

Among digital still cameras, silver-halide film cameras, and the like, an image pickup optical system to be used in a single-lens reflex camera is required to have a wide angle of view for shooting, which is approximately 40 to 60 degrees. Such image pickup optical system is also required to have a large aperture ratio as well as a capability of focusing an image at a high speed, while maintaining high optical performance.

As a focusing method used in an image pickup optical system, there is a method where the entire image pickup optical system moves, or a method where a lens unit forming a part of an image pickup optical system moves. Among these methods, a method referred to as an inner focus system is known. In the inner focus system, an intermediate lens unit in an image pickup optical system moves to adjust a focus of the lens. The inner focus system enables a reduction of an amount of movement of a lens unit which moves during focusing (a focusing-lens unit), and facilitates miniaturization and weight reduction of the focusing-lens unit, compared to a focusing method where the entire image pickup optical system moves.

As a result, the focusing-lens unit can be moved at a high speed during focusing. Moreover, in such a focusing-lens unit, it is possible to decrease a drive torque at the time of focusing. Therefore, in a case where the focusing-lens unit is applied to an image pickup apparatus having an auto focus detection device, for example, a drive motor can be easily downsized.

Conventionally, there has been known an image pickup optical system having a relatively wide shooting angle of view which employs an inner focus system. U.S. Pat. No. 4,852,984 and Japanese Patent Application Laid-Open No. 1-185507 each discuss an image pickup optical system including, from an object side to an image side, a first lens unit having a positive refractive power, a second lens unit having a negative refractive power, which moves during focusing, and a third lens unit having a positive refractive power, in this order.

When the inner focus system is employed in an image pickup optical system having a large aperture ratio and a wide angle of view, a height of a principal ray of on-axis rays or off-axis rays from an optical axis fluctuates widely, in a lens unit located on an object side relative to a focusing-lens unit. This causes a larger aberration variation in focusing. To address this problem, there has been known an image pickup optical system using a "floating" system, in which a plurality of lens unit moves to adjust a focus. The floating system can reduce an aberration variation caused by bringing a short-distance object into focus.

Japanese Patent Application Laid-Open No. 2012-168456 discusses an image pickup optical system including, from an object side to an image side, a first lens unit having a positive refractive power, a second lens unit having a negative refractive power, a third lens unit having a positive or negative refractive power, and a fourth lens unit having a positive refractive power, in this order. In this optical system, the second and fourth lens units move during focusing, thereby high optical performance can be achieved over the entire object distance.

SUMMARY

According to an aspect of the present invention, an optical system includes, from an object side to an image side, a front lens unit having a positive refractive power, an aperture stop, and a rear lens unit having a positive refractive power, in this order. The front lens unit includes an FB lens system having a negative refractive power, and an FA lens system having a negative refractive power, the FB lens system and the FA lens system being configured to move toward an image side and an object side, respectively, when shifting a focus from an object at a long distance to an object at a short distance. Alternatively, the front lens unit includes an FB lens system having a negative refractive power, and an FA lens system having a positive refractive power, the FB lens system and the FA lens system being configured to move toward an image side, respectively, when shifting a focus from an object at a long distance to an object at a short distance, wherein the following conditional expression is satisfied:

$$0.70 < |fFB/f| < 3.00$$

where fFB represents a focal length of the FB lens system, and f represents a focal length of the entire optical system.

Further features of the present invention will become apparent from the following description of exemplary embodiments with reference to the attached drawings.

BRIEF DESCRIPTION OF THE DRAWINGS

FIGS. 6A and 6B are aberration charts of the optical system according to the third exemplary embodiment, focusing on an object at infinity and an object at a short distance, respectively.

DESCRIPTION OF THE EMBODIMENTS

The following is a description of an optical system and an image pickup apparatus including the optical system, according to an embodiment of the present invention. The optical system includes, from an object side to an image side, a front lens unit having a positive refractive power, an aperture stop, and a rear lens unit having a positive refractive power in this order.

The front lens unit includes a lens system FB having a negative refractive power and a lens system FA having a negative refractive power. The lens system FB moves toward an image side, while the lens system FA moves toward an object side, during shift of a focus from an object at a long distance to an object at a short distance. Alternatively, the front lens unit includes a lens system FB having a negative refractive power and a lens system FA having a positive refractive power. In the latter case, the lens systems FB and FA each move toward an image side, during shift of a focus from an object at a long distance to an object at a short distance. The optical system according to an embodiment of the present invention is applicable to an image pickup optical system which is used in an image pickup apparatus and a projection optical system such as a projector, which is used in an optical apparatus.

Figure 1:
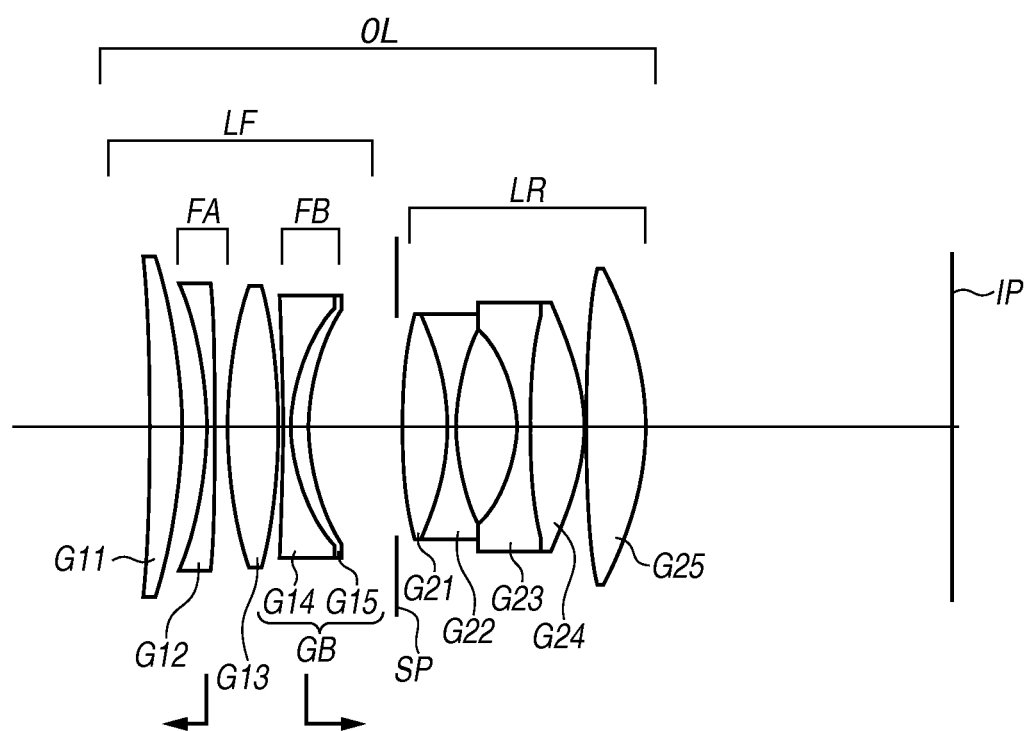
FIG. 1 is a cross-sectional view of an optical system according to a first exemplary embodiment.
Figure 2A:
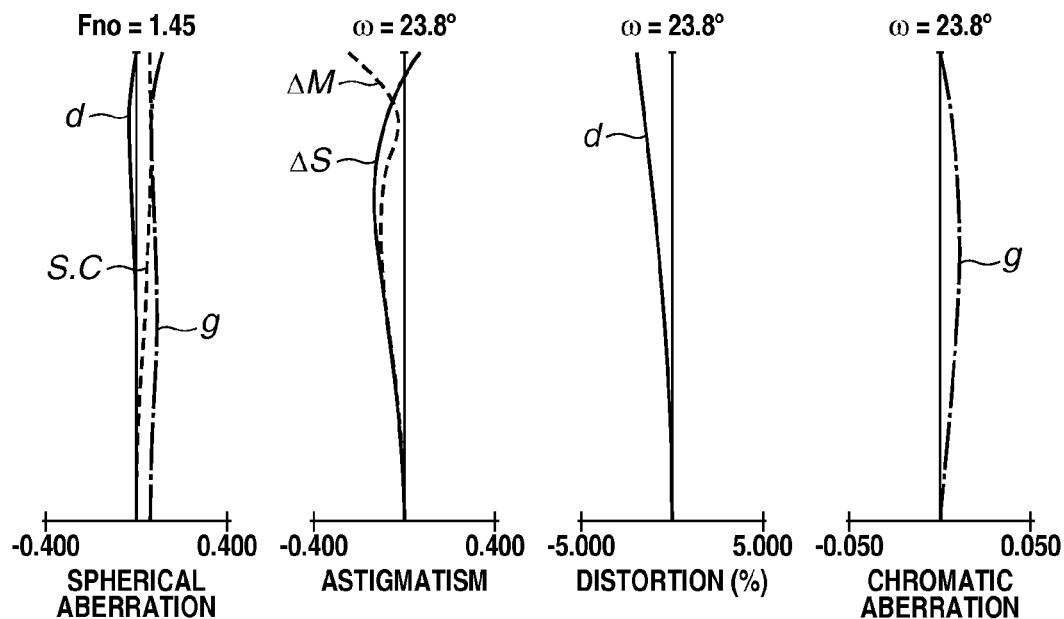
FIGS. 2A and 2B are aberration charts of the optical system according to the first exemplary embodiment, focusing on an object at infinity and an object at a short distance, respectively.
Figure 2B:
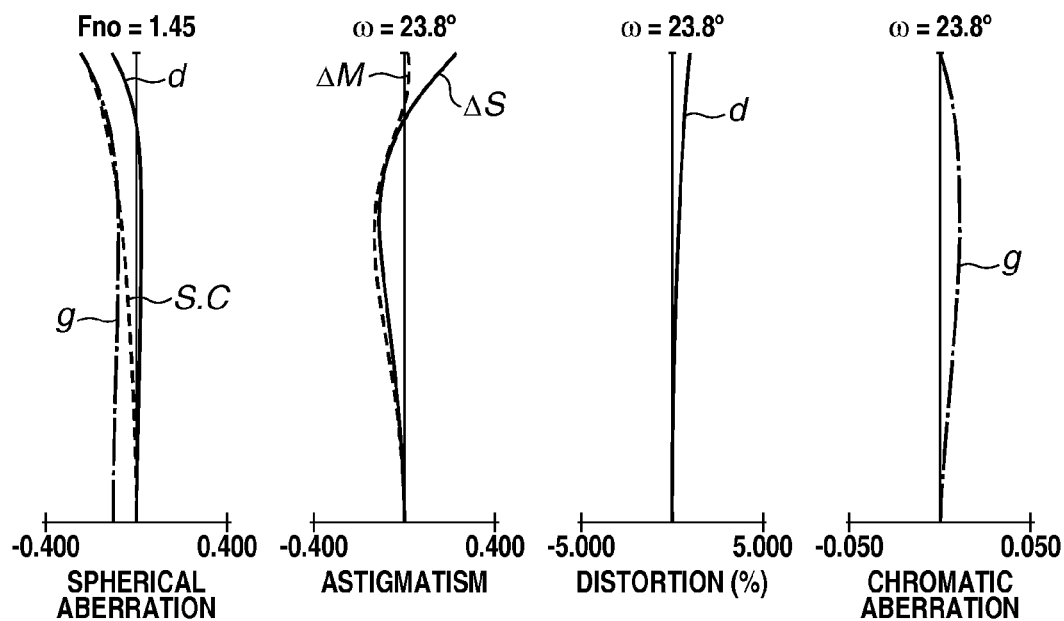

FIG. 1 is a cross-sectional view of an image pickup optical system according to a first exemplary embodiment of the present invention, which is focusing on an object at infinity. FIGS. 2A and 2B are longitudinal-aberration charts of the image pickup optical system according to the first exemplary embodiment, which is focusing on the object at infinity and an object at a short distance (450 mm), respectively. The image pickup optical system according to the first exemplary embodiment has a shooting angle of view of approximately 47.6 degrees and an F-number of approximately 1.45.

Figure 3:
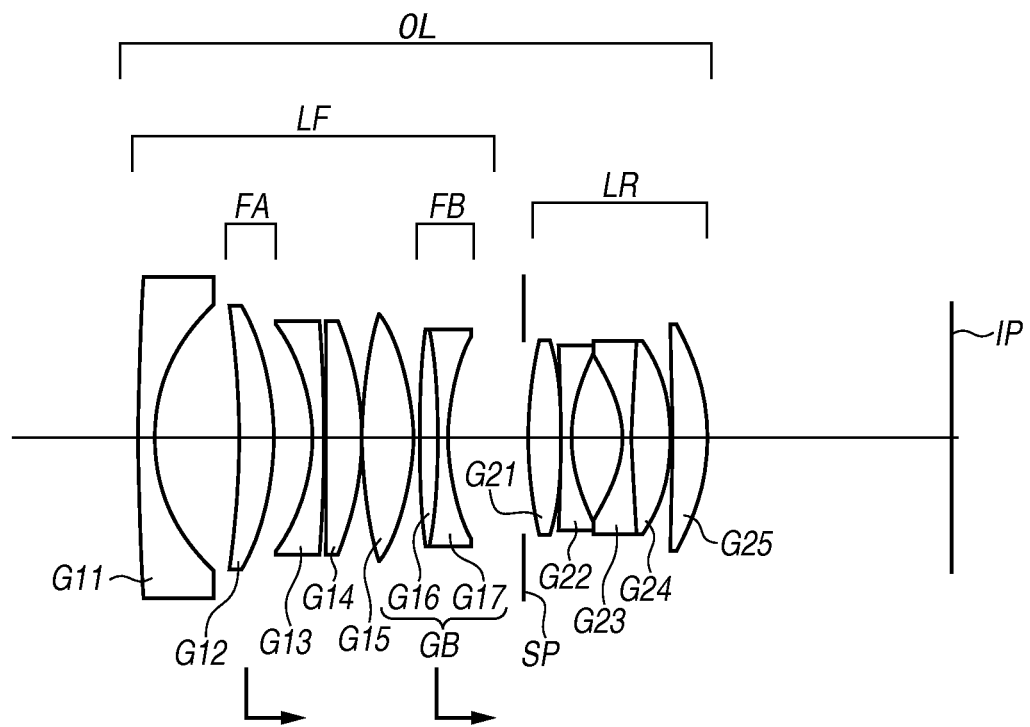
FIG. 3 is a cross-sectional view of an optical system according to a second exemplary embodiment.
Figure 4A:
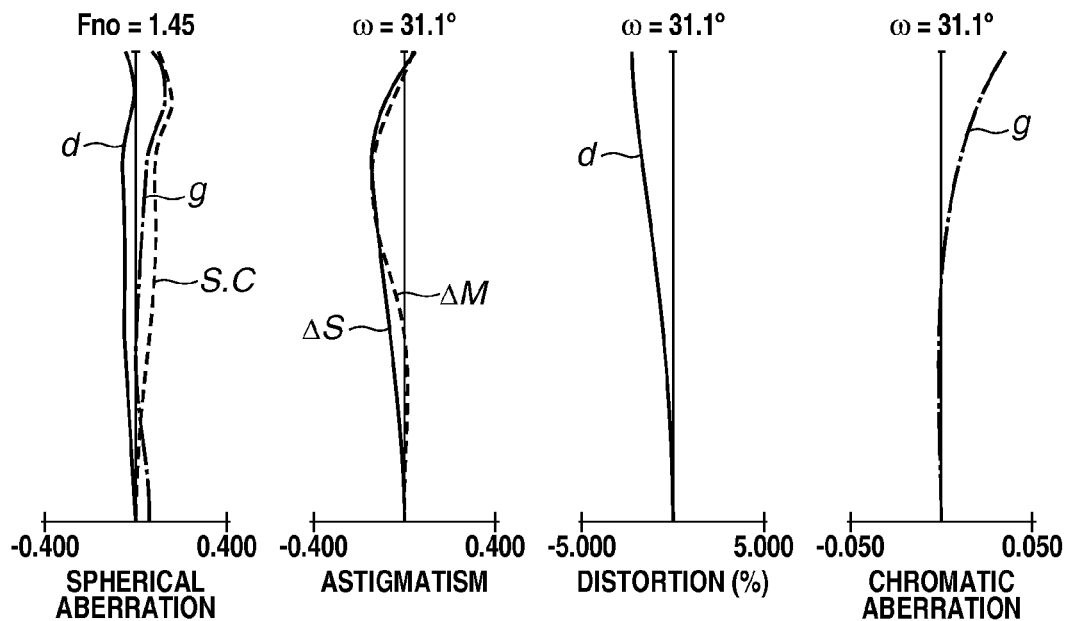
FIGS. 4A and 4B are aberration charts of the optical system according to the second exemplary embodiment, focusing on an object at infinity and an object at a short distance, respectively.
Figure 4B:
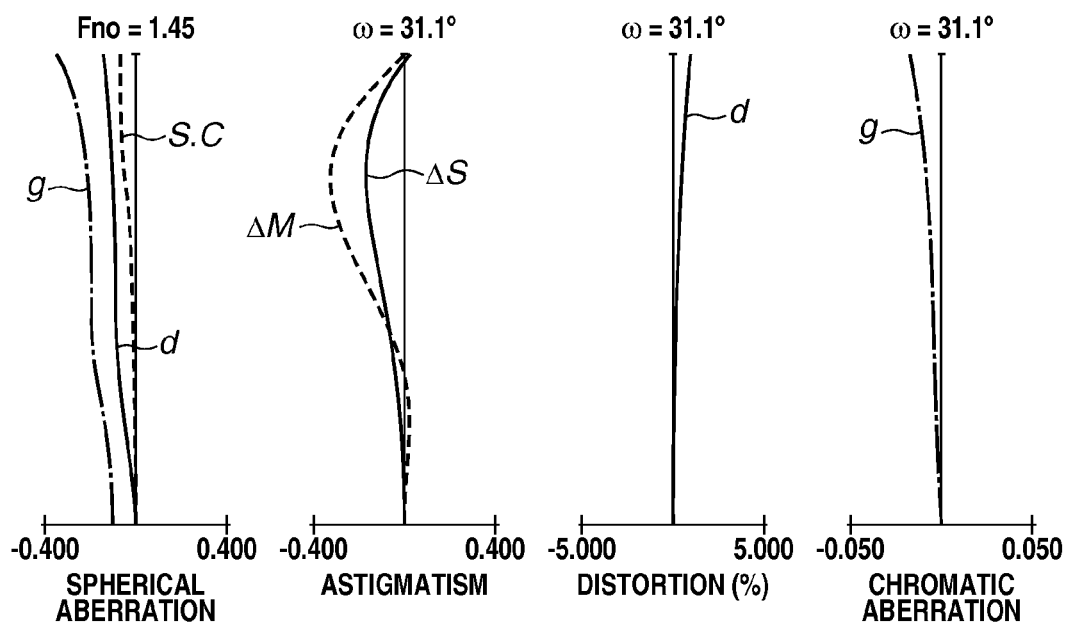

FIG. 3 is a cross-sectional view of an image pickup optical system according to a second exemplary embodiment of the present invention, focusing an object at infinity. FIGS. 4A and 4B are longitudinal-aberration charts of the image pickup optical system according to the second exemplary embodiment, which is focusing on the object at infinity and an object at a short distance (300 mm), respectively. The image pickup optical system according to the second exemplary embodiment has a shooting angle of view of approximately 62.2 degrees and an F-number of approximately 1.45.

Figure 5:
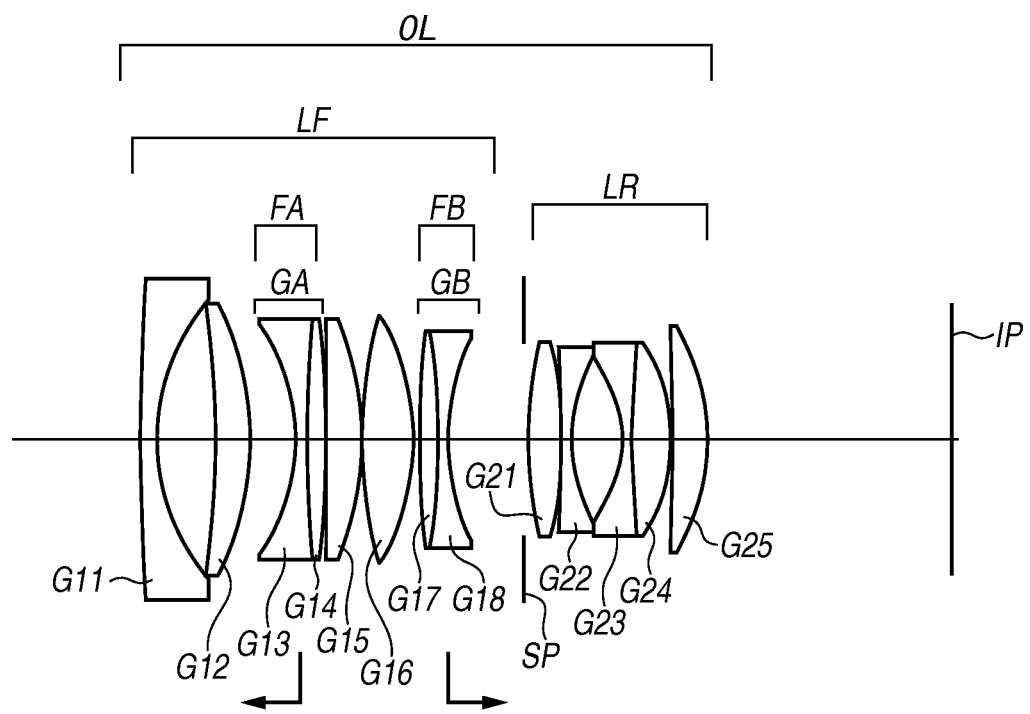
FIG. 5 is a cross-sectional view of an optical system according to a third exemplary embodiment.

FIG. 5 is a cross-sectional view of an image pickup optical system according to a third exemplary embodiment of the present invention, which is focusing on an object at infinity. FIGS. 6A and 6B are longitudinal-aberration charts of the image pickup optical system according to the third exemplary embodiment, which is focusing on the object at infinity and an object at a short distance (300 mm), respectively. The image pickup optical system according to the third exemplary embodiment has a shooting angle of view of approximately 63.0 degrees and an F-number of approximately 1.45.

Figure 7:
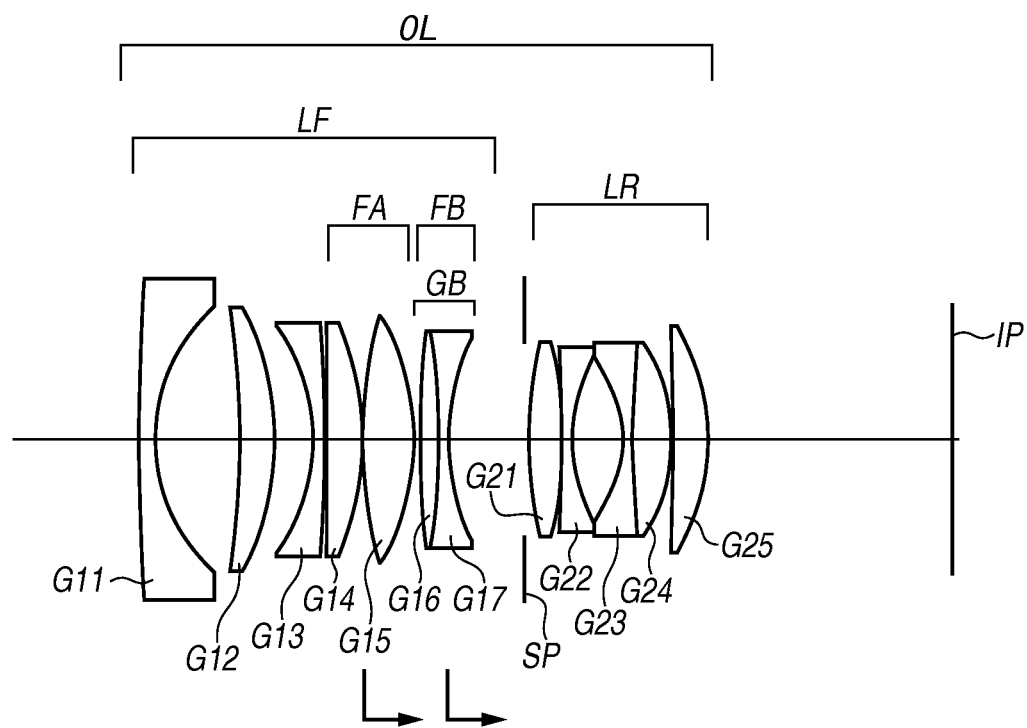
FIG. 7 is a cross-sectional view of an optical system according to a fourth exemplary embodiment.
Figure 8A:
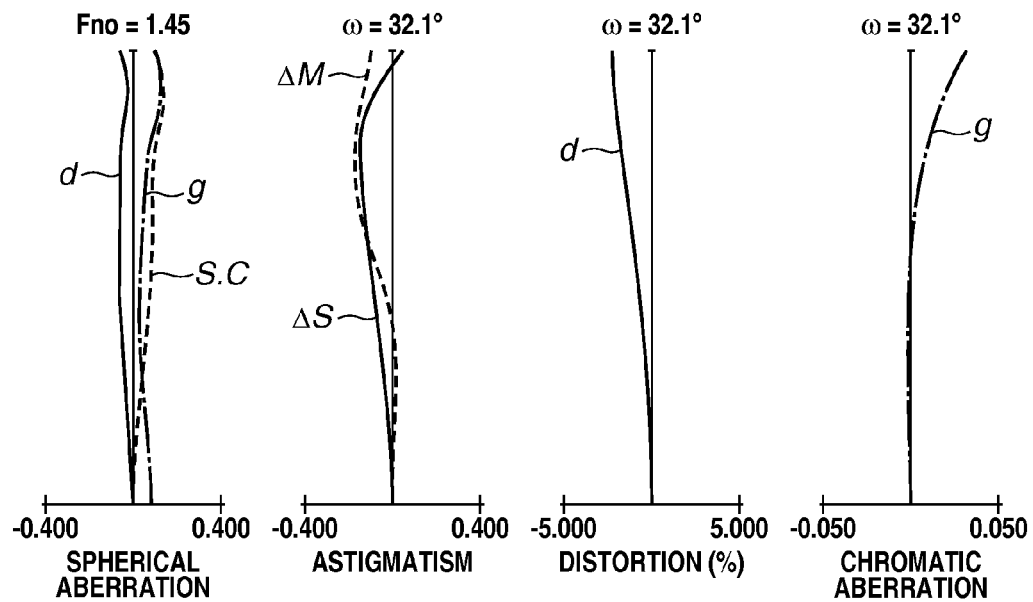
FIGS. 8A and 8B are aberration charts of the optical system according to the fourth exemplary embodiment, focusing on an object at infinity and an object at a short distance, respectively.
Figure 8B:
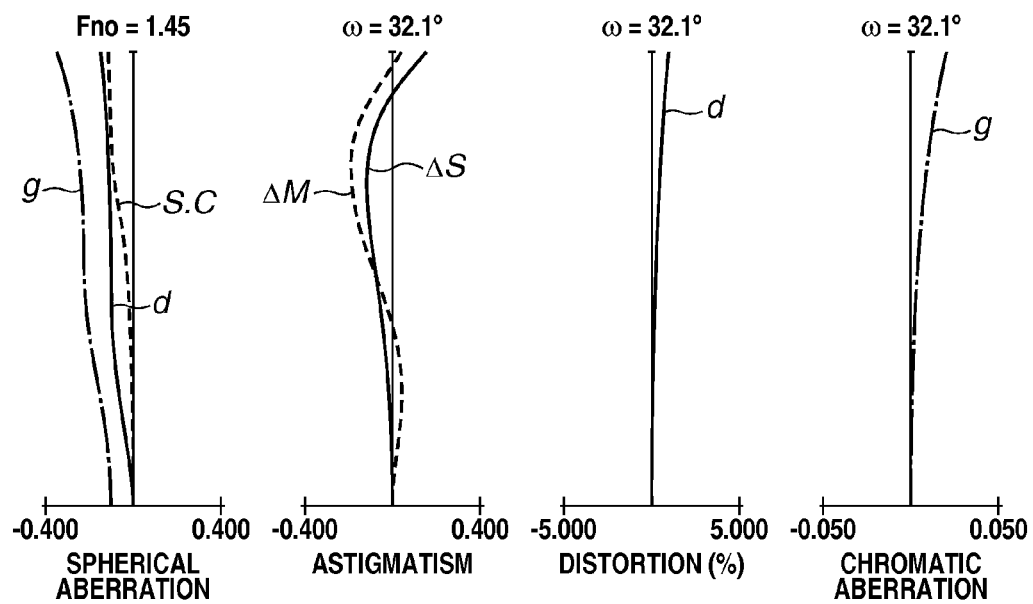

FIG. 7 is a cross-sectional view of an image pickup optical system according to a fourth exemplary embodiment of the present invention, which is focusing on an object at infinity. FIGS. 8A and 8B are longitudinal-aberration charts of the image pickup optical system according to the fourth exemplary embodiment, which is focusing on the object at infinity and an object at a short distance (300 mm), respectively. The image pickup optical system according to the fourth exemplary embodiment has a shooting angle of view of approximately 64.2 degrees and an F-number of approximately 1.45.

Figure 9:
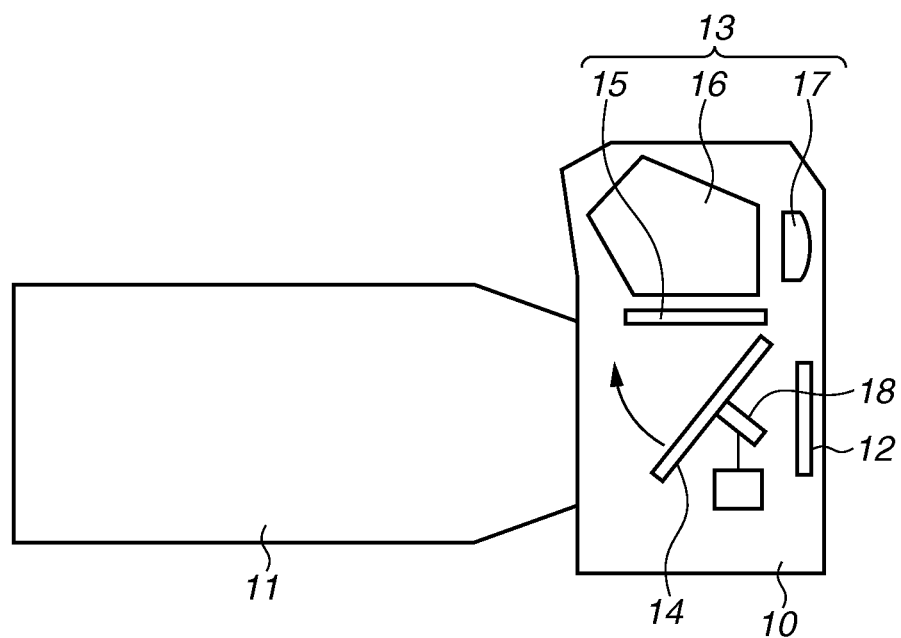
FIG. 9 is a schematic diagram of an image pickup apparatus according to an embodiment of the present invention.

The above numerical values of the objects at a short distance correspond to the numerical values expressed in mm, which is provided in Numerical Examples below. FIG. 9 is a schematic diagram of an image pickup apparatus according to an embodiment of the present invention. In the cross-sectional view of the image pickup optical system, an object side (front, a magnification side) is on the left, and an image side (rear, a reduction side) is on the right. OL denotes the optical system. The optical system includes, from the object side to the image side, a front lens unit LF having a positive refractive power, an aperture stop SP, and a rear lens unit LR having a positive refractive power in this order.

In the cross-sectional view of the lens, FA and FB represent lens systems, which move during the focusing. Arrows indicate moving directions in which the lens systems FA and FB move when shifting a focus from an object at infinity to an object at a short distance. The lens system FB functions mainly in the focusing. The lens system FA functions in a floating operation to reduce an aberration variation which occurs during the focusing.

IP denotes an image plane. When the optical system is used as an image pickup optical system in a video camera and a digital still camera, the image plane IP forms an image sensing surface of a solid-state image-pickup element (a photoelectric conversion element) such as a charge-coupled device sensor (a CCD sensor) and a complementary metal-oxide semiconductor sensor (a CMOS sensor). When the optical system is used in a silver-halide film camera, the image plane IP forms a film surface. In a spherical aberration chart, a solid line d represents a d-line, and a dashed-dotted line g represents a g-line. A dotted line S.C represents a sine condition.

In an astigmatism chart, a dashed line ΔM represents a meridional image plane of the d-line, and a solid line ΔS represents a sagittal image plane of the d-line. A distortion aberration is represented by the d-line. A lateral chromatic aberration is represented by g-line. Fno denotes an F-number, and ω denotes a half angle of view (in degrees).

A Gauss-type image pickup optical system is known as an image pickup optical system having a long back focus as well as a wide angle of view for shooting of approximately 40 to 60 degrees. In the Gauss-type image pickup optical system, it is relatively easy to obtain a wider view angle and a larger aperture ratio, while obtaining a long back focus. However, in most cases, focusing is controlled by moving the entire image pickup optical system. In this method, high-speed focusing is difficult due to heavy weight of the entire image pickup optical system.

On the other hand, an inner focus system is employed in the optical system according to an embodiment of the present invention. In the optical system, therefore, the lens system FB having a negative refractive power, which is located near the aperture stop SP, moves toward an image side during shift of a focus from an object at a long distance to an object at a short distance. In this method, high-speed focusing is easier than in the method that moves the entire optical system, because the lens system for focusing is light in weight.

In the front lens unit LF having a positive refractive power, a positive distortion aberration is generated by a lens system located on an object side relative to the lens system FB for focusing, while a negative distortion aberration is generated by the lens system FB for focusing, which has a negative refractive power. According to the exemplary embodiments, the front lens unit LF having a positive refractive power is configured such that the above positive distortion aberration is counteracted by the above negative distortion aberration.

According to the exemplary embodiments, an incident height of a principal ray of off-axis rays from an optical axis is greater in a lens system located on an object side relative to the lens system FB for focusing. For this reason, the positive distortion aberration remains undercorrected. The positive distortion aberration remaining undercorrected is counteracted by a negative distortion aberration generated by the rear lens unit LR having a positive refractive power. The rear lens unit LR is arranged opposite to the front lens unit LF having a positive refractive power across the aperture stop SP. As a result, a distortion aberration is excellently corrected in the entire optical system.

When the lens system FB for focusing moves toward an image side during the shift of a focus from an object at a long distance to an object at a short distance, an incident height of a principal ray of off-axis rays from an optical axis is lower in the lens system FB for focusing. This reduces a negative distortion aberration generated by the lens system FB. Therefore, a larger positive distortion aberration remains in the front lens unit LF. This makes it difficult to counteract the remaining positive distortion aberration with a negative distortion aberration generated by the rear lens unit LR. As a result, a larger positive distortion aberration occurs in the entire optical system.

Hence, in each of the exemplary embodiments, an aberration variation is reduced by moving the lens system FA having a positive refractive power included in the front lens unit LF toward an image side, during the shift of a focus from an object at a long distance to an object at a short distance. Alternatively, the aberration variation is reduced by moving the lens system FA having a negative refractive power toward an object side.

The lens system FA having a negative refractive power is moved toward the object side to raise an incident height of a principal ray of off-axis rays from an optical axis. As a result, a larger negative distortion aberration occurs. Thus, a positive distortion aberration generated by a lens system located on the object side relative to the lens system FB for focusing is reduced, which remains when bringing the object at a short distance into focus. Alternatively, the lens system FA in the front lens unit LF and having a positive refractive power is moved toward an image side, to lower an incident height of a principal ray of off-axis rays from an optical axis. Thus, a very positive distortion aberration, which is generated by a lens system located on an object side relative to the lens system FB for focusing is reduced. With the above configuration, a variation of a distortion aberration when adjusting the focus is decreased.

If an aperture ratio becomes larger, various aberrations, especially a spherical aberration and a coma aberration, are generated in a larger extent by a lens system located on an object side relative to the lens system FB for focusing. This leads to a decline in image quality. The optical system according to each of the exemplary embodiments is configured, as in the case of a distortion aberration, such that a spherical aberration and a coma aberration generated by a lens system located on an object side relative to the lens system FB for focusing is counteracted by the lens system FB having a negative refractive power. When the lens system FB for focusing which has a negative refractive power moves toward an image side at the time of shifting a focus from an object at a long distance to an object at a short distance, an incident height of a principal ray of on-axis rays, from an optical axis, is lowered in the lens system FB.

Therefore, when an object at a short distance is in focus, the lens system FB for focusing has a less effect in counteracting a spherical aberration and a coma aberration, and as a result, variations are increased in various aberrations caused by focusing. To reduce such spherical and coma aberrations that are generated during the focusing, it is required to properly determine the refractive power of the lens system FB for focusing.

According to the above discussion, in each of the exemplary embodiments, the following conditional expression is satisfied:

$$0.70 < |fFB/f| < 3.00 \quad (1)$$

where fFB denotes a focal length of the lens system FB for focusing, and f denotes a focal length of the entire optical system. Conditional Expression (1) relates to the focal length of the lens system FB for focusing. Based on Conditional Expression (1), an aberration variation caused by the focusing is reduced, while allowing an increased aperture ratio.

When the negative refractive power of the lens system FB for focusing increases (when an absolute value of the negative refractive power increases) to exceed a lower limit of Conditional Expression (1), variations in various aberrations increase in the focusing. When the negative refractive power of the lens system FB for focusing decreases (when an absolute value of the negative refractive power decreases) to exceed an upper limit of Conditional Expression (1), the extending distance of the lens system FB becomes long in the focusing. This makes the entire optical system larger in size.

It is desirable to specify a numerical range of Conditional Expression (1) as provided below.

$$0.80 < |fFB/f| < 2.80 \quad (1a)$$

More desirably, a numerical range of Conditional Expression (1a) is specified as provided below.

$$0.90 < |fFB/f| < 2.60 \quad (1b)$$

With the above conditional expressions, an optical system can be obtained which has a wide shooting angle of view of approximately 40 to 60 degrees and a large aperture ratio with an F-number of approximately 1.4. At the same time, the optical system can also reduce an aberration variation generated during the focusing.

In each of the exemplary embodiments, it is more desirable that at least one of the conditional expressions below is satisfied. In the conditional expressions, XA and XB denote amounts of movement of the lens systems FA and FB, respectively, when shifting a focus from an object at infinity to an object at a short distance. The value of the amount of movement toward an image side is regarded as positive, and the value of the amount of movement toward an object side is regarded as negative. Further, ff denotes a focal length of a lens system located on an object side relative to the lens system FB, at the time of focusing an object at infinity. A focal length of the rear lens unit LR is denoted by fLR. The lens system FB includes one or more positive lenses and one or more negative lenses. An Abbe number of a material for at least one of the positive lenses is denoted by vd.

Here are the conditional expressions. It is desirable that at least one of them is satisfied.

$$0.05 < |XA/XB| < 0.50 \quad (2)$$

$$0.60 < ff/f < 1.40 \quad (3)$$

$$0.70 < fLR/f < 1.60 \quad (4)$$

$$0.60 < ff/fLR < 1.30 \quad (5)$$

$$vd < 23.5 \quad (6)$$

Each of the conditional expressions is described below from a technical viewpoint.

Conditional Expression (2) relates to a ratio of an amount of movement of the lens system FA to that of the lens system FB, in the focusing. According to Conditional Expression (2), an aberration variation generated during the focusing is effectively reduced. When the amount of movement of the lens system FA decreases to exceed the lower limit of Conditional Expression (2), a larger positive distortion aberration is generated by a lens system located on an object side relative to the lens system FB, when shifting a focus to an object at a short distance. This results in a larger variation of distortion aberration in the focusing. When the amount of movement of the lens system FA increases to exceed the upper limit of Conditional Expression (2), larger space is needed for movement of the lens system FA. This makes the entire optical system larger in size. It is desirable to specify a numerical range of Conditional Expression (2) as provided below.

$$0.07 < |XA/XB| < 0.45 \quad (2a)$$

More desirably, a numerical range of Conditional Expression (2a) is specified as provided below.

$$0.09 < |XA/XB| < 0.40 \quad (2b)$$

According to Conditional Expression (3), the entire optical system can be downsized and optical performance thereof is excellently maintained. When a focal length of a lens system located on an object side relative to the lens system FB decreases to exceed the lower limit of Conditional Expression (3), various aberrations such as a spherical aberration and a coma aberration occur in a larger extent, which leads to a decline in image quality.

Especially, as an aperture ratio becomes larger, image quality deteriorates significantly. It is undesirable that the upper limit of Conditional Expression (3) is exceeded, as a total lens length increases. Particularly, as the lens system FB becomes larger, an effect in converging light fluxes incident on the lens system FB is diminished. It is desirable to specify a numerical range of Conditional Expression (3) as provided below.

$$0.70 < ff/f < 1.30 \quad (3a)$$

More desirably, a numerical range of Conditional Expression (3a) is specified as provided below.

$$0.80 < ff/f < 1.20 \quad (3b)$$

According to Conditional Expression (4), optical performance is excellently maintained. The optical system according to each of the exemplary embodiments includes, from an object side to an image side, the front lens unit LF having a positive refractive power, the aperture stop SP, and the rear lens unit LR having a positive refractive power in this order. The optical system thus has a lens configuration which is substantially symmetrical with respect to the aperture stop SP. With this optical arrangement, an off-axis aberration generated in the front lens unit LF, especially a distortion aberration and a lateral chromatic aberration, is counteracted by the rear lens unit LR.

When the refractive power of the rear lens unit LR increases to exceed the lower limit of Conditional Expression (4), the refractive power of the rear lens unit LR becomes too much higher than that of the front lens unit LF. This means an effect in counteracting an off-axis aberration is insufficient. Accordingly, a distortion aberration and a lateral chromatic aberration increase. When the refractive power of the rear lens unit LR decreases to exceed the upper limit of Conditional Expression (4), the refractive power of the rear lens unit LR becomes too much lower than that of the front lens unit LF. This means an effect in counteracting an off-axis aberration becomes insufficient. Accordingly, a distortion aberration and a lateral chromatic aberration increase. It is desirable to specify a numerical range of Conditional Expression (4) as provided below.

$$0.80 < fLR/f < 1.50 \quad (4a)$$

Conditional Expression (5) relates to a ratio of a focal length of a lens system located on an object side relative to the lens system FB to a focal length of the rear lens unit LR. According to Conditional Expression (5), mainly, an off-axis aberration is excellently corrected. When the upper or lower limit of Conditional Expression (5) is exceeded, an effect in counteracting an off-axis aberration becomes insufficient between a lens system located on an object side relative to the lens system FB and the rear lens unit LR. Accordingly, a distortion aberration and a lateral chromatic aberration increase. It is desirable to specify a numerical range of Conditional Expression (5) as provided below.

$$0.70 < ff/fLR < 1.20 \quad (5a)$$

Conditional Expression (6) relates to an Abbe number of a material used in a positive lens included in the lens system FB. According to Conditional Expression (6), a variation of a chromatic aberration in focusing is reduced. When the Abbe number of the material for the positive lens increases to exceed the upper limit of Conditional Expression (6), a chromatic aberration remains undercorrected in the lens system FB having a negative refractive power. This makes it difficult to correct satisfactorily an on-axis chromatic aberration and a lateral chromatic aberration over the entire object distance. It is more desirable to specify a numerical value of Conditional (6) as provided below.

$$vd < 23.0 \quad (6a)$$

A lens configuration in each of the exemplary embodiments is described below. In each of the exemplary embodiments, the lens system FA is located on an object side relative to the lens system FB. In the first to third exemplary embodiments, a lens system which stays immobile in focusing is situated between the lens systems FA and FB. In the fourth exemplary embodiment, the lens systems FA and FB are located facing each other. Here, "facing each other" means no lens system is interposed between the lens systems FA and FB.

Next, a lens configuration of the optical system according to the first exemplary embodiment of the present invention is described below, with reference to FIG. 1. In the following description, individual lens elements included in the front lens unit LF and the rear lens unit LR are mentioned in order of arrangement from an object side to an image side. The front lens unit LF having a positive refractive power includes a positive lens G11 of a meniscus shape with a concave surface on an object side, a negative lens G12 of a meniscus shape with a concave surface on an object side, a positive lens G13 of a biconvex shape, and a cemented lens GB. The cemented lens GB is formed by bonding a negative lens G14 of a biconcave shape and a positive lens G15 of a meniscus shape with a convex surface on an object side, to have a negative refractive power as a whole.

The positive lens G11 and the positive lens G13 each have an aspherical surface, whereby aberrations such as a spherical aberration and a coma aberration are excellently corrected. The rear lens unit LR having a positive refractive power includes a cemented lens formed by bonding a positive lens G21 of a biconvex shape and a negative lens G22 of a biconcave shape, a cemented lens formed by bonding a negative lens G23 of a biconcave shape and a positive lens G24 of a biconvex shape, and a positive lens G25 of a biconvex shape. The positive lens G25 has an aspherical surface, whereby an off-axis aberration is excellently corrected. An aperture stop SP is interposed between the front lens unit LF and the rear lens unit LR.

When shifting a focus from an object at a long distance to an object at a short distance, the cemented lens GB (the lens system FB) having a negative refractive power moves toward an image side, and the negative lens G12 (the lens system FA) moves toward an object side. This reduces a variation of a distortion aberration in focusing.

A lens configuration of the optical system according to the second exemplary embodiment of the present invention is described below, with reference to FIG. 3. The front lens unit LF having a positive refractive power includes a negative lens G11 of a meniscus shape with a convex surface on an object side, a positive lens G12 of a meniscus shape with a concave surface on an object side, a negative lens G13 of a meniscus shape with a concave surface on an object side, a positive lens G14 of a biconvex shape, a positive lens G15 of a biconvex shape, and a cemented lens GB. The negative cemented lens GB is formed by bonding a positive lens G16 of a biconvex shape and a negative lens G17 of a biconcave shape, to have a negative refractive power as a whole.

The positive lens G14 and the negative lens G17 each have an aspherical surface, whereby aberrations such as a spherical aberration and a coma aberration are excellently corrected. The rear lens unit LR having a positive refractive power includes a positive lens G21 of a biconvex shape, a negative lens G22 of a biconcave shape, a cemented lens formed by bonding a negative lens G23 of a biconcave shape and a positive lens G24 of a biconvex shape, and a positive lens G25 of a meniscus shape with a convex surface on an image side. The positive lens G25 has an aspherical surface, whereby an off-axis aberration is excellently corrected. An aperture stop SP is interposed between the front lens unit LF and the rear lens unit LR.

When shifting a focus from an object at a long distance to an object at a short distance, the cemented lens GB (the lens system FB) having a negative refractive power moves toward an image side, and the positive lens G12 (the lens system FA) moves toward an image side. This reduces a variation of a distortion aberration in focusing. As in the case of the first exemplary embodiment, the lens of the optical system is configured such that an optical system can be obtained with a reduced aberration variation in the focusing as well as an increased aperture ratio.

A lens configuration of the optical system according to the third exemplary embodiment of the present invention is described below, with reference to FIG. 5. The front lens unit LF having a positive refractive power includes a negative lens G11 of a meniscus shape with a concave surface on an image side, a positive lens G12 of a meniscus shape with a convex surface on an image side, and a cemented lens GA. The cemented lens GA is formed by bonding a negative lens G13 of a biconcave shape and a positive lens G14 of a biconvex shape, to have a negative refractive power as a whole. The front lens unit LF further includes a positive lens G15 of a biconvex shape, a positive lens G16 of a biconvex shape, and a cemented lens GB. The cemented lens GB is formed by bonding a positive lens G17 of a biconvex shape and a negative lens G18 of a biconcave shape, to have a negative refractive power as a whole.

The positive lens G15 and the negative lens G18 each have an aspherical surface, whereby aberrations such as a spherical aberration and a coma aberration are excellently corrected. The rear lens unit LR having a positive refractive power includes a positive lens G21 of a biconvex shape, a negative lens G22 of a biconcave shape, a cemented lens formed by bonding a negative lens G23 of a biconcave shape and a positive lens G24 of a biconvex shape, and a positive lens G25 of a meniscus shape with a convex surface on an image side. The positive lens G25 has an aspherical surface, whereby an off-axis aberration is excellently corrected. An aperture stop SP is interposed between the front lens unit LF and the rear lens unit LR.

When shifting a focus from an object at a long distance to an object at a short distance, the cemented lens GB (the lens system FB) having a negative refractive power moves toward an image side, and the cemented lens GA (the lens system FA) having a negative refractive power in a combined focal length moves toward an object side. This reduces a variation of a distortion aberration in focusing. As in the case of the first exemplary embodiment, the lens of the optical system is configured such that an optical system can be obtained with a reduced aberration variation in focusing as well as an increased aperture ratio.

A lens configuration of the optical system according to the fourth exemplary embodiment of the present invention is described below, with reference to FIG. 7. The front lens unit LF having a positive refractive power includes a negative lens G11 of a meniscus shape with a convex surface on an object side, a positive lens G12 of a meniscus shape with a concave surface on an object side, a negative lens G13 of a meniscus shape with a concave surface on an object side, and a positive lens G14 of a biconvex shape. The front lens unit LF further includes a positive lens G15 of a biconvex shape, and a negative cemented lens GB formed by bonding a positive lens G16 of a biconvex shape and a negative lens G17 of a biconcave shape.

The positive lens G14 and the negative lens G17 each have an aspherical surface, whereby aberrations such as a spherical aberration and a coma aberration are excellently corrected. The rear lens unit LR having a positive refractive power includes a positive lens G21 of a biconvex shape, a negative lens G22 of a biconcave shape, a cemented lens formed by bonding a negative lens G23 of a biconcave shape and a positive lens G24 of a biconvex shape, and a positive lens G25 of a meniscus shape with a convex surface on an image side. The positive lens G25 has an aspherical surface, whereby an off-axis aberration is excellently corrected. An aperture stop SP is interposed between the front lens unit LF and the rear lens unit LR.

When shifting a focus from an object at a long distance to an object at a short distance, the cemented lens GB (the lens system FB) having a negative refractive power moves toward an image side, and the lens system FA having a positive refractive power, which includes the positive lenses G14 and G15, moves toward an image side. This reduces a variation of a distortion aberration in focusing. As in the case of the first exemplary embodiment, the lens of the optical system is configured such that an optical system with a reduced aberration variation in the focusing can be obtained as well as an increased aperture ratio.

While the present invention has been described with reference to the foregoing exemplary embodiments, the present invention is not limited to such exemplary embodiments. Various modifications and alterations may be made without departing from the spirit of the invention.

Next, a description will be given below, with reference to FIG. 9, of an exemplary embodiment of a single-lens reflex camera system (an image pickup apparatus) in which the optical system according to an embodiment of the present invention is used. The single-lens reflex camera system illustrated in FIG. 9 includes a main body 10, an interchangeable lens assembly 11, a recording unit 12, a finder optical system 13, and a quick-return mirror 14. The interchangeable lens assembly 11 includes an optical system according to an embodiment of the present invention. The recording unit 12, such as film and an image sensor, records (receives light of) an object image formed through the interchangeable lens assembly 11. The finder optical system 13 is used in observing the object image received from the interchangeable lens assembly 11. The quick-return mirror 14 turns about to transmit the object image received from the interchangeable lens assembly 11 to the recording unit 12 and the finder optical system 13 in a switching manner.

In a case of observing an object image through a finder, an object image formed on a focusing plate 15 via the quick-return mirror 14 is inverted by a pentagonal prism 16 to obtain an erect image, and then the image is magnified and viewed through an eyepiece optical system 17. When doing shooting, the quick-return mirror 14 turns in the direction of an arrow, so that the object image can be formed on the recording unit 12 and recorded therein. The single-lens reflex camera system also includes a sub mirror 18 and a focus detection device 19.

Consequently, by applying the optical system according to an embodiment of the present invention to an image pickup apparatus such as an interchangeable lens assembly for a single-lens reflex camera, an image pickup apparatus of inner focus type is obtained, which has a wide angle of view of approximately 40 to 60 degrees as well as a large aperture ratio with an F-number of approximately 1.4. The present invention is also applicable to a camera without a quick-return mirror.

Provided below are Numerical Examples 1 to 4, which correspond to the first to fourth exemplary embodiments of the optical system according to the present invention, respectively. In each of Numerical Examples, i indicates a surface number counted from an object side, ri indicates a curvature radius of an i-th lens surface counted from the object side, di indicates a thickness of an i-th lens or a distance of an i-th air interspace, and ndi and vdi indicate a refractive index and an Abbe number with reference to a d-line, respectively, of a material for an i-th lens. The variable interspace indicates a value when an object distance changes.

Focal lengths of the front lens unit LF, the rear lens unit LR, the lens system FA, and the lens system FB are given in Numerical Examples. Furthermore, an aspherical shape is represented by the following expression:

$$x=(h^2/r)/[1+\{1-(1+K)\times(h/r)^2\}^{1/2}]+A4\times h^4+A6\times h^6+A8\times h^8+A10\times h^{10}+A12\times h^{12}$$

where, direction of light travel is regarded as positive, x represents a displacement amount in an optical axis direction with reference to a surface vertex, h denotes a height from the optical axis in a direction perpendicular to the optical axis, r denotes a paraxial curvature radius, K denotes a conic constant, and A4, A6, A8, A10, and A12 denote aspherical coefficients. In numerical values, "E±XX" means "$\times 10^{\pm XX}$". Table 1 shows the relation between the foregoing conditional expressions and Numerical Examples.

Numerical Example 1

| Unit mm | | | | | |
|---|---|---|---|---|---|
| Surface data | | | | | |
| Surface number | r | d | nd | vd | Effective diameter |
| 1 | −310.269 | 4.18 | 1.85400 | 40.4 | 41.44 |
| 2* | −54.710 | (variable) | | | 40.87 |
| 3 | −51.860 | 1.30 | 1.85478 | 24.8 | 35.19 |
| 4 | −265.838 | (variable) | | | 34.04 |
| 5 | 57.252 | 6.42 | 1.77250 | 49.6 | 34.05 |
| 6* | −68.478 | (variable) | | | 33.68 |
| 7 | −511.783 | 1.10 | 1.60311 | 60.6 | 31.80 |
| 8 | 23.785 | 1.99 | 1.80809 | 22.8 | 28.94 |
| 9 | 28.769 | (variable) | | | 28.46 |
| 10 (Stop) | ∞ | 0.70 | | | 27.41 |
| 11 | 71.034 | 5.40 | 1.88300 | 40.8 | 27.12 |
| 12 | −33.098 | 1.20 | 1.60342 | 38.0 | 26.80 |
| 13 | 29.672 | 7.62 | | | 23.66 |
| 14 | −17.914 | 1.50 | 1.85478 | 24.8 | 23.46 |
| 15 | 69.881 | 6.87 | 1.88300 | 40.8 | 27.97 |
| 16 | −32.303 | 0.15 | | | 30.16 |
| 17 | 144.375 | 7.62 | 1.85400 | 40.4 | 37.85 |
| 18* | −35.185 | 38.10 | | | 38.50 |
| Image plane | ∞ | | | | |

| Aspherical surface data | | |
|---|---|---|
| Second surface | | |
| K = 0.00000e+000 | A4 = 4.15820e−006 | A6 = −2.66397e−009 |
| A8 = 1.63206e−012 | A10 = −3.42288e−017 | |
| Sixth surface | | |
| K = 0.00000e+000 | A4 = −3.12237e−007 | A6 = 5.76283e−009 |
| A8 = −8.37899e−012 | A10 = 4.69602e−015 | |
| Eighteenth surface | | |
| K = 0.00000e+000 | A4 = 3.65767e−006 | A6 = 1.15138e−009 |
| A8 = 2.41050e−012 | A10 = −1.89551e−015 | |

| Various kinds of data | |
|---|---|
| Focal length | 49.10 |
| F-number | 1.45 |
| Half angle of view (degrees) | 23.78 |
| Image height | 21.64 |
| Total lens length | 100.16 |
| BF | 38.10 |

| | Infinite object distance | Object distance 450 mm |
|---|---|---|
| d2 | 2.83 | 1.02 |
| d4 | 1.42 | 3.24 |
| d6 | 0.51 | 7.00 |
| d9 | 11.24 | 4.75 |
| Entrance pupil position | | 30.69 |
| Exit pupil position | | −58.83 |
| Front principal point position | | 54.92 |
| Rear principal point position | | −11.00 |

| Zoom lens unit data | | | | | | |
|---|---|---|---|---|---|---|
| Lens unit (Lens system) | Starting surface | Ending surface | Focal length | Lens configuration length | Front principal point position | Rear principal point position |
| LF | 1 | 9 | 165.55 | 19.76 | −12.03 | −22.72 |
| LR | 11 | 18 | 44.32 | 30.36 | 25.78 | 6.92 |
| FA | 3 | 4 | −75.59 | 1.30 | −0.17 | −0.87 |
| FB | 7 | 9 | −48.94 | 3.09 | 2.16 | 0.36 |

Single lens element data

-continued

Unit mm

| Lens | Starting surface | Focal length |
|---|---|---|
| 1 | 1 | 77.20 |
| 2 | 3 | −75.59 |
| 3 | 5 | 41.28 |
| 4 | 7 | −37.66 |
| 5 | 8 | 144.15 |
| 6 | 11 | 26.21 |
| 7 | 12 | −25.74 |
| 8 | 14 | −16.55 |
| 9 | 15 | 25.83 |
| 10 | 17 | 33.79 |

Numerical Example 2

Unit mm

Surface data

| Surface number | r | d | nd | vd | Effective diameter |
|---|---|---|---|---|---|
| 1 | 457.618 | 2.50 | 1.48749 | 70.2 | 50.00 |
| 2 | 29.672 | (variable) | | | 41.68 |
| 3 | −158.058 | 5.41 | 1.85478 | 24.8 | 40.49 |
| 4 | −50.080 | (variable) | | | 40.35 |
| 5 | −31.714 | 1.90 | 1.84666 | 23.9 | 34.63 |
| 6 | −430.754 | 0.20 | | | 35.69 |
| 7* | 273.371 | 5.58 | 1.80400 | 46.6 | 35.81 |
| 8 | −48.370 | 0.20 | | | 36.22 |
| 9 | 72.914 | 8.05 | 1.59282 | 68.6 | 37.75 |
| 10 | −41.408 | (variable) | | | 37.78 |
| 11 | 173.580 | 3.02 | 1.80809 | 22.8 | 33.73 |
| 12 | −118.732 | 1.50 | 1.77250 | 49.6 | 33.29 |
| 13* | 37.794 | (variable) | | | 30.58 |
| 14 (Stop) | ∞ | 0.80 | | | 30.03 |
| 15 | 68.190 | 5.30 | 1.88300 | 40.8 | 29.88 |
| 16 | −68.441 | 0.20 | | | 29.38 |
| 17 | −202.162 | 1.30 | 1.51742 | 52.4 | 28.10 |
| 18 | 26.334 | 8.05 | | | 25.34 |
| 19 | −20.076 | 1.50 | 1.80809 | 22.8 | 25.24 |
| 20 | 148.582 | 6.08 | 1.80400 | 46.6 | 28.83 |
| 21 | −31.858 | 0.15 | | | 29.83 |
| 22 | −1146.274 | 5.77 | 1.85400 | 40.4 | 34.29 |
| 23* | −33.068 | 38.09 | | | 35.00 |
| Image plane | ∞ | | | | |

Aspherical surface data

Seventh surface

K = 0.00000e+000  A4 = −5.33449e−006  A6 = −4.93317e−009
A8 = 2.69050e−011  A10 = −7.23479e−014  A12 = 5.90834e−017

Thirteenth surface

K = 0.00000e+000  A4 = 2.06653e−006  A6 = 6.39602e−009
A8 = −4.30461e−011  A10 = 2.02219e−013  A12 = −3.25094e−016

Twenty-third surface

K = 0.00000e+000  A4 = 3.42517e−006  A6 = −5.40713e−009
A8 = 3.19229e−011  A10 = −7.28895e−014  A12 = 6.22738e−017

Various kinds of data

| Focal length | 35.88 |
|---|---|
| F-number | 1.45 |
| Half angle of view (degrees) | 31.09 |
| Image height | 21.64 |
| Total lens length | 128.03 |
| BF | 38.09 |

| | Infinite object | Object distance |
|---|---|---|

| distance | | 300 mm |
|---|---|---|
| d2 | 13.41 | 16.01 |
| d4 | 6.07 | 3.47 |
| d10 | 1.00 | 8.55 |
| d13 | 11.93 | 4.38 |
| Entrance pupil position | | 33.95 |
| Exit pupil position | | −47.12 |
| Front principal point position | | 54.72 |
| Rear principal point position | | 2.22 |

Lens unit data

| Lens unit (Lens system) | Starting surface | Ending surface | Focal length | Lens configuration length | Front principal point position | Rear principal point position |
|---|---|---|---|---|---|---|
| LF | 1 | 13 | 135.62 | 48.84 | 53.17 | 34.33 |
| LR | 15 | 23 | 48.03 | 28.35 | 23.67 | 2.77 |
| FA | 3 | 4 | 83.83 | 5.41 | 4.17 | 1.32 |
| FB | 11 | 13 | −65.61 | 4.52 | 3.34 | 0.79 |

Single lens element data

| Lens | Starting surface | Focal length |
|---|---|---|
| 1 | 1 | −65.21 |
| 2 | 3 | 83.83 |
| 3 | 5 | −40.52 |
| 4 | 7 | 51.52 |
| 5 | 9 | 45.75 |
| 6 | 11 | 87.65 |
| 7 | 12 | −36.96 |
| 8 | 15 | 39.40 |
| 9 | 17 | −44.94 |
| 10 | 19 | −21.80 |
| 11 | 20 | 33.13 |
| 12 | 22 | 39.78 |

Numerical Example 3

Unit mm

Surface data

| Surface number | r | d | nd | vd | Effective diameter |
|---|---|---|---|---|---|
| 1 | 313.955 | 2.50 | 1.60311 | 60.6 | 49.29 |
| 2 | 32.830 | 9.62 | | | 42.13 |
| 3 | −126.074 | 4.90 | 1.80809 | 22.8 | 42.07 |
| 4 | −48.795 | (variable) | | | 42.03 |
| 5 | −31.756 | 1.90 | 1.84666 | 23.9 | 34.96 |
| 6 | 146.052 | 3.17 | 1.90366 | 31.3 | 36.48 |
| 7 | −165.231 | (variable) | | | 36.65 |
| 8* | 555.263 | 4.88 | 1.80400 | 46.6 | 36.75 |
| 9 | −55.357 | 0.20 | | | 37.14 |
| 10 | 72.569 | 8.04 | 1.59282 | 68.6 | 37.83 |
| 11 | −41.887 | (variable) | | | 37.88 |
| 12 | 104.844 | 3.25 | 1.80809 | 22.8 | 33.86 |
| 13 | −163.599 | 1.50 | 1.77250 | 49.6 | 33.39 |
| 14* | 36.729 | (variable) | | | 30.59 |
| 15 (Stop) | ∞ | 0.80 | | | 29.60 |
| 16 | 88.618 | 4.86 | 1.88300 | 40.8 | 29.38 |
| 17 | −66.425 | 0.20 | | | 28.94 |
| 18 | −325.097 | 1.30 | 1.51742 | 52.4 | 27.57 |
| 19 | 26.877 | 8.06 | | | 25.06 |
| 20 | −19.484 | 1.50 | 1.80809 | 22.8 | 24.93 |
| 21 | 129.080 | 5.69 | 1.80400 | 46.6 | 28.72 |
| 22 | −34.326 | 0.15 | | | 29.58 |
| 23 | −9537.864 | 6.31 | 1.85400 | 40.4 | 34.25 |

-continued

Unit mm

| | | | | |
|---|---|---|---|---|
| 24* | −30.333 | 38.09 | | 35.00 |
| Image plane | ∞ | | | |

Aspherical surface data

Eighth surface

K = 0.00000e+000    A4 = −5.36445e−006    A6 = −4.17964e−009
A8 = 1.64736e−011    A10 = −4.52672e−014    A12 = 3.32215e−017

Fourteenth surface

K = 0.00000e+000    A4 = 1.66531e−006    A6 = 1.15469e−008
A8 = −9.85511e−011    A10 = 4.20390e−013    A12 = −6.27804e−016

Twenty-fourth surface

K = 0.00000e+000    A4 = 4.43873e−006    A6 = −4.79289e−009
A8 = 3.43315e−011    A10 = −8.03719e−014    A12 = 7.93139e−017

Various kinds of data

| | |
|---|---|
| Focal length | 35.32 |
| F-number | 1.45 |
| Half angle of view(degrees) | 31.49 |
| Image height | 21.64 |
| Total lens length | 128.08 |
| BF | 38.09 |

| | Infinite object distance | Object distance 300 mm |
|---|---|---|
| d4 | 7.36 | 6.07 |
| d7 | 0.20 | 1.48 |
| d11 | 0.99 | 9.12 |
| d14 | 12.59 | 4.47 |

| | |
|---|---|
| Entrance pupil position | 32.94 |
| Exit pupil position | −48.17 |
| Front principal point position | 53.80 |
| Rear principal point position | 2.78 |

Lens unit data

| Lens unit (Lens system) | Starting surface | Ending surface | Focal length | Lens configuration length | Front principal point position | Rear principal point position |
|---|---|---|---|---|---|---|
| LF | 1 | 14 | 110.48 | 48.51 | 48.52 | 30.73 |
| LR | 16 | 24 | 48.50 | 28.08 | 24.59 | 5.10 |
| FA | 5 | 7 | −49.01 | 5.07 | −0.74 | −3.49 |
| FB | 12 | 14 | −78.88 | 4.75 | 4.35 | 1.62 |

Single lens element data

| Lens | Starting surface | Focal length |
|---|---|---|
| 1 | 1 | −60.99 |
| 2 | 3 | 95.80 |
| 3 | 5 | −30.66 |
| 4 | 6 | 86.21 |
| 5 | 8 | 62.83 |
| 6 | 10 | 46.00 |
| 7 | 12 | 79.50 |
| 8 | 13 | −38.70 |
| 9 | 16 | 43.64 |
| 10 | 18 | −47.92 |
| 11 | 20 | −20.85 |
| 12 | 21 | 34.26 |
| 13 | 23 | 35.62 |

Numerical Example 4

Unit mm

Surface data

| Surface number | r | d | nd | vd | Effective diameter |
|---|---|---|---|---|---|
| 1 | 180.257 | 2.50 | 1.60311 | 60.6 | 48.69 |
| 2 | 29.841 | 12.15 | | | 41.04 |
| 3 | −114.420 | 5.37 | 1.80809 | 22.8 | 40.32 |
| 4 | −45.348 | 5.40 | | | 40.27 |
| 5 | −29.720 | 1.90 | 1.84666 | 23.9 | 35.82 |
| 6 | −198.700 | (variable) | | | 37.68 |
| 7* | 395.858 | 6.27 | 1.77250 | 49.6 | 37.89 |
| 8 | −44.965 | 0.20 | | | 38.65 |
| 9 | 89.406 | 7.76 | 1.59282 | 68.6 | 37.66 |
| 10 | −39.682 | (variable) | | | 37.65 |
| 11 | 97.742 | 2.92 | 1.80809 | 22.8 | 33.74 |
| 12 | −306.412 | 1.50 | 1.77250 | 49.6 | 33.29 |
| 13* | 37.061 | (variable) | | | 30.77 |
| 14 (Stop) | ∞ | 0.80 | | | 29.68 |
| 15 | 87.658 | 5.04 | 1.88300 | 40.8 | 29.46 |
| 16 | −61.193 | 0.20 | | | 29.02 |
| 17 | −189.674 | 1.30 | 1.51742 | 52.4 | 27.61 |
| 18 | 26.623 | 8.08 | | | 24.94 |
| 19 | −19.274 | 1.50 | 1.80809 | 22.8 | 24.81 |
| 20 | 118.620 | 5.76 | 1.80400 | 46.6 | 28.65 |
| 21 | −34.387 | 0.15 | | | 29.62 |
| 22 | 1953.952 | 6.42 | 1.85400 | 40.4 | 34.47 |
| 23* | −30.384 | 38.09 | | | 35.21 |
| Image plane | ∞ | | | | |

Aspherical surface data

Seventh surface

K = 0.00000e+000    A4 = −6.64404e−006    A6 = −3.95749e−009
A8 = 2.22647e−011    A10 = −5.40424e−014    A12 = 3.38934e−017

Thirteenth surface

K = 0.00000e+000    A4 = 1.27812e−006    A6 = 4.18855e−009
A8 = −3.38970e−011    A10 = 1.54483e−013    A12 = −2.47188e−016

Twenty-third surface

K = 0.00000e+000    A4 = 4.58651e−006    A6 = −3.68361e−009
A8 = 2.91151e−011    A10 = −6.69207e−014    A12 = 6.66843e−017

Various kinds of data

| | |
|---|---|
| Focal length | 34.52 |
| F-number | 1.45 |
| Half angle of view (degrees) | 32.08 |
| Image height | 21.64 |
| Total lens length | 128.15 |
| BF | 38.09 |

| | Infinite object distance | Object distance 300 mm |
|---|---|---|
| d6 | 0.20 | 1.27 |
| d10 | 0.99 | 9.13 |
| d13 | 13.64 | 4.43 |

| | |
|---|---|
| Entrance pupil position | 32.57 |
| Exit pupil position | −49.77 |
| Front principal point position | 53.53 |
| Rear principal point position | 3.58 |

Lens unit data

| Lens unit (Lens system) | Starting surface | Ending surface | Focal length | Lens configuration length | Front principal point position | Rear principal point position |
|---|---|---|---|---|---|---|
| LF | 1 | 13 | 109.28 | 47.16 | 49.95 | 34.31 |
| LR | 15 | 23 | 48.15 | 28.45 | 24.86 | 5.15 |

-continued

Unit mm

| | | | | | | |
|---|---|---|---|---|---|---|
| FA | 7 | 10 | 25.98 | 14.23 | 5.40 | −3.51 |
| FB | 11 | 13 | −83.09 | 4.42 | 4.25 | 1.70 |

Single lens element data

| Lens | Starting surface | Focal length |
|---|---|---|
| 1 | 1 | −59.67 |
| 2 | 3 | 89.84 |
| 3 | 5 | −41.49 |
| 4 | 7 | 52.60 |
| 5 | 9 | 47.42 |
| 6 | 11 | 92.00 |
| 7 | 12 | −42.72 |
| 8 | 15 | 41.47 |
| 9 | 17 | −45.03 |
| 10 | 19 | −20.42 |
| 11 | 20 | 33.72 |
| 12 | 22 | 35.09 |

TABLE 1

| | | Numerical Example 1 | Numerical Example 2 | Numerical Example 3 | Numerical Example 4 |
|---|---|---|---|---|---|
| (1) | \|fFB/f\| | 1.00 | 1.83 | 2.23 | 2.41 |
| (2) | \|XA/XB\| | 0.28 | 0.34 | 0.16 | 0.12 |
| (3) | ff/f | 0.86 | 1.06 | 1.13 | 1.17 |
| (4) | fLR/f | 0.90 | 1.34 | 1.37 | 1.39 |
| (5) | ff/fLR | 0.95 | 0.79 | 0.82 | 0.84 |
| (6) | vd | 22.8 | 22.8 | 22.8 | 22.8 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-009268 filed Jan. 22, 2014, which is hereby incorporated by reference herein in its entirety.

What is claimed is:

1. An optical system comprising, in order from an object side to an image side:
   a front lens unit having a positive refractive power;
   an aperture stop; and
   a rear lens unit having a positive refractive power,
   wherein the front lens unit includes an FB lens system having a negative refractive power, and an FA lens system having a negative refractive power located on the object side relative to the FB lens system, the FB lens system and the FA lens system being configured to move toward the image side and the object side, respectively, when shifting a focus from an object at a long distance to an object at a short distance, or
   the front lens unit includes an FB lens system having a negative refractive power, and an FA lens system having a positive refractive power located on the object side relative to the FB lens system, both the FB lens system and the FA lens system being configured to move toward the image side, respectively, when shifting a focus from an object at a long distance to an object at a short distance, and
   wherein the following conditional expression is satisfied:

$0.70 < |fFB/f| < 3.00$ where fFB represents a focal length of the FB lens system, and
   f represents a focal length of the entire optical system.

2. The optical system according to claim 1, wherein the following conditional expression is satisfied:

$0.05 < |XA/XB| < 0.50$ where XA denotes an amount of movement of the FA lens system and XB denotes an amount of movement of the FB lens system when shifting a focus from an object at infinity to an object at a short distance, where a value of an amount of movement toward the image side is regarded as positive, and a value of an amount of movement toward the object side is regarded as negative.

3. The optical system according to claim 1, wherein the following conditional expression is satisfied:

$0.60 < ff/f < 1.40$ where ff denotes a focal length of a lens system located on the object side relative to the FB lens system at the time of focusing an object at infinity.

4. The optical system according to claim 1, wherein the following conditional expression is satisfied:

$0.70 < fLR/f < 1.60$ where fLR denotes a focal length of the rear lens unit.

5. The optical system according to claim 1, wherein the following conditional expression is satisfied:

$0.60 < ff/fLR < 1.30$ where ff denotes a focal length of a lens system located on the object side relative to the FB lens system at the time of focusing an object at infinity, and fLR denotes a focal length of the rear lens unit.

6. The optical system according to claim 1, wherein the FB lens system includes one or more positive lenses and one or more negative lenses, and
   wherein the following conditional expression is satisfied:

$vd < 23.5$ where vd denotes an Abbe number of a material for at least one of the positive lenses.

7. The optical system according to claim 1, wherein a lens system which is unmoved in focusing is disposed between the FA lens system and the FB lens system.

8. The optical system according to claim 1, wherein the FA lens system and the FB lens system are located facing each other.

9. The optical system according to claim 1, wherein an image is formed on a photoelectric conversion element.

10. An image pickup apparatus comprising:
    an optical system; and
    a photoelectric conversion element configured to receive light of an image formed by the optical system,
    wherein the optical system includes, from an object side to an image side:
    a front lens unit having a positive refractive power;
    an aperture stop; and
    a rear lens unit having a positive refractive power in this order,
    wherein the front lens unit includes an FB lens system having a negative refractive power, and an FA lens system having a negative refractive power located on the object side relative to the FB lens system, both the FB lens system and the FA lens system being configured to move toward the image side and the object side, respectively, when shifting a focus from an object at a long distance to an object at a short distance, or, the front lens unit includes an FB lens system having a negative refractive power, and an FA lens system having a positive refractive power located on the object side relative to the FB lens system, the FB lens system and the FA lens system being configured to move toward the image side, respectively, when shifting a focus from an object at a long distance to an object at a short distance, and wherein the following conditional expression is satisfied:

$$0.70 < |fFB/f| < 3.00$$

where fFB represents a focal length of the FB lens system, and f represents a focal length of the entire optical system.

* * * * *